United States Patent
Reimers et al.

(10) Patent No.: US 6,416,904 B1
(45) Date of Patent: Jul. 9, 2002

(54) CALENDERED DOUBLE SIDE SEGMENT COATED WEBS

(75) Inventors: Jan Naess Reimers, Maple Ridge (CA); Akiyoshi Manabe, Yokohama (JP); Alexander Man-Chung Leung, Vancouver (CA)

(73) Assignee: E-One Moli Energy (Canada) Limited, Maple Ridge (CA)

( * ) Notice: Subject to any disclaimer, the term of this patent is extended or adjusted under 35 U.S.C. 154(b) by 0 days.

(21) Appl. No.: 09/694,167

(22) Filed: Oct. 23, 2000

Related U.S. Application Data

(62) Division of application No. 09/115,938, filed on Jul. 15, 1998, now Pat. No. 6,146,694.

(30) Foreign Application Priority Data

Dec. 3, 1997 (CA) .............................. 2223364

(51) Int. Cl.[7] .............................................. H01M 4/02
(52) U.S. Cl. .................. 429/231.95; 429/209; 429/212; 429/224; 429/233
(58) Field of Search ............................ 429/233, 231.95, 429/209, 224, 212

(56) References Cited

U.S. PATENT DOCUMENTS

| | | | |
|---|---|---|---|
| 4,302,518 A | * 11/1981 | Goodenough et al. | ...... 429/194 |
| 4,507,371 A | * 3/1985 | Thackeray et al. | .......... 429/191 |
| 5,278,000 A | * 1/1994 | Huang et al. | .................. 429/91 |
| 5,650,245 A | 7/1997 | Zhong et al. | ................ 429/196 |
| 5,707,756 A | 1/1998 | Inoue et al. | .................. 429/57 |
| 5,776,627 A | * 7/1998 | Mao et al. | ..................... 429/61 |
| 5,876,500 A | 3/1999 | Kurimoto | .................... 118/669 |
| 5,882,218 A | * 3/1999 | Reimers | ...................... 429/224 |
| 5,989,747 A | * 11/1999 | Tanaka et al. | .......... 429/231.95 |
| 6,027,835 A | * 2/2000 | Fukumura et al. | ........... 429/233 |
| 6,033,797 A | * 3/2000 | Mao et al. | ..................... 429/61 |

FOREIGN PATENT DOCUMENTS

| | | |
|---|---|---|
| CA | 2093898 | 10/1994 |
| CA | 2147578 | 10/1996 |
| CA | 2163187 | 5/1997 |
| JP | 01-184069 | 7/1989 |

* cited by examiner

*Primary Examiner*—Cathy F. Lam
(74) *Attorney, Agent, or Firm*—Synnestvedt & Lechner LLP

(57) ABSTRACT

An improved design and manufacturing method is disclosed for calendered, double side segment coated webs. By staggering the leading edges and/or the trailing edges of the segment coatings on one side of the web from those on the other side, web damage, including the incidence of breakage, can be reduced. Further, vibration and wear on the calendering apparatus can be reduced. The invention is particularly useful for heavily calendered webs such as the electrodes in non-aqueous rechargeable lithium ion batteries.

12 Claims, 3 Drawing Sheets

CALENDERED DOUBLE SIDE SEGMENT COATED WEBS

CROSS-REFERENCE TO RELATED APPLICATION

This application is a Divisional of U.S. patent application Ser. No. 09/115,938 filed Jul. 15, 1998, now U.S. Pat. No. 6,146,694, the disclosure of which is incorporated herein by reference.

FIELD OF THE INVENTION

This invention pertains to the design and manufacturing methods of segment coated webs which have segment coatings applied on both sides of the web and which have been calendered thereafter. It particularly pertains to improvements in the design and manufacture of heavily calendered, double side segment coated electrodes for non-aqueous rechargeable lithium ion batteries.

BACKGROUND OF THE INVENTION

Commercial products prepared in continuous webs are commonplace and include paper rolls, plastic films, and the like. Frequently, the web is surface treated in some manner. For instance, the web can be used as a substrate upon which various coatings are applied (eg. as with sticky tape or audio tape). Many continuous web products are calendered in order to compact an applied coating or even to compact the web itself (eg. paper). Calendering is typically done by running the web through a set of calendering rollers where the nip or gap between the rollers is set in accordance with the amount of compaction desired. Many techniques for processing webs appear in the art generally and many varied types of related apparatus have been developed for commercial use. An excellent reference on this subject is "Web Processing and Converting Technology and Equipment", edited by D. Satas, Van Nostrand Reinhold, 1984, wherein a detailed overview of the art is presented.

With the introduction of lithium ion batteries in the marketplace, a new specialty area pertaining to web processing has been created. Lithium ion batteries are a preferred rechargeable power source for many consumer electronics applications, particularly laptop computers and cellular phones, and such batteries have been available commercially since about 1991. Lithium ion batteries are characterized by a large energy density (Wh/L) and high operating voltage (typically above 3½ volts). Due to the relatively low ionic conductivity of the non-aqueous electrolytes employed in these batteries, very thin electrodes (circa 100 micrometers thick) are generally used in order to obtain reasonable discharge and recharge rate capability. These thin electrodes are typically made in continuous webs by coating a suitable current collector material with the appropriate active electrode material.

The conventional construction of commercial lithium ion batteries is described in many references, including Canadian patent application serial numbers 2,147,578 (filed Apr. 21, 1995) or 2,163,187 (filed Nov. 17, 1995). Two different lithium insertion compounds are used therein for the active cathode and anode materials that both have ample capacity for reversible lithium insertion but that have differing lithium insertion potential. At this time, a lithium transition metal oxide (eg. $LiCoO_2$, $LiNiO_2$, $LiMn_2O_4$) is usually employed as the cathode material and a carbonaceous compound (eg. coke, graphite, hard disordered carbon) is usually used as the anode material. Various lithium salt and non-aqueous solvent combinations are used in the battery electrolyte.

Commercial products typically appear in cylindrical (eg. 4/3 A size) or prismatic (a rectangular parallelepiped shape) formats and typically contain a spiral winding inside, often referred to as a jelly roll. The jelly roll is a spiral winding of thin continuous web components including a cathode foil, an anode foil, and two microporous polyolefin sheets that act as separators. Both sides of the cathode and anode foils are coated with active electrode material.

Cathode foils for the jelly roll are prepared by applying a mixture of a suitable powdered (circa 10 micron particle size) cathode material.(eg. $LiCoO_2$), a binder, and a conductive dilutant onto a thin aluminum foil web (circa 10 micron thick). The aluminum foil web serves as a mechanical substrate or support for the active cathode powder and also as an electrical current collector in the assembled battery. Typically, the application method first involves dissolving the binder in a suitable liquid carrier. Then, a slurry is prepared using this solution plus the other powdered solid components. The slurry is then coated uniformly onto the substrate foil using a coating method suitable for accurately applying powder slurries. Afterwards, the carrier solvent is evaporated away. The amount of web substrate that ultimately winds up in the assembled battery is usually minimized in order to make the most use of the space available inside for active electrode material. In this way, the all important capacity of the assembled battery can be maximized. Thus, the thinnest web that can practically be handled is used. Generally, manufacturers coat both sides of the foil substrate in order to minimize the net thickness of substrate appearing in the assembled battery (ie. rather than use two single side coated foils back-to-back in the jelly roll winding).

After the coating is applied, the cathode foil is calendered to compact the porous powdered active coating. Again, this maximizes the amount of active electrode material that can be stuffed into a battery container and hence maximizes battery capacity. Calendering also can desirably improve electrical contact between the particles in the coating and can further improve adhesion between the particles and between the coating and the foil. The extent of the conventional calendering is typically limited by mechanical considerations rather than by battery performance considerations. Although greater compaction can be desirable from the battery design perspective, greater compaction can severely distort the web substrate such that it can no longer be handled.

Anode foils are prepared in a like manner except that a suitable anode powder (eg. a graphitic carbon) is used instead of the cathode material and thin copper foil is usually used instead of aluminum.

Because the metal foil webs serve as electrical current collectors in an assembled battery, some sort of electrical connection must be made to the webs. Typically, a flexible metal tab is welded to each respective metal foil web. However, in order to access a web, portions of the web must be exposed, either by cleaning off the coating or by leaving certain sections uncoated. The latter option is often preferred since it obviates the need for subsequent cleaning of the coated web. While segment coaters may not be able to coat quite as quickly as continuous coaters, battery assembly overall can be more efficient (and is certainly a cleaner process) if web cleaning operations can be avoided.

Segment coater devices have been developed recently with this purpose in mind. Such coaters can apply segment coatings on both sides of a metal foil web for use in lithium ion battery applications. With these segment coaters, not only can the thicknesses of the segment coatings be precisely controlled, but also the alignment and edges of the segment coatings can be precisely controlled such that small, aligned uncoated sections can be reproducibly formed on the coated web for purposes of attaching tabs thereto. Canadian patent application serial number 2,093,898 of Moli Energy and Japanese laid open patent application number 01-184069 of Sony both disclose coating apparatus suitable for this kind of segment coating.

As manufacturers attempt to achieve ever greater compaction of lithium ion battery electrodes, problems specific to segment coatings have been observed. At the discontinuities in the segment coating (or edges thereof), sudden transitions occur during the calendering process. Such transitions result in sudden loadings and unloadings of the calendering roller apparatus and of the web itself. This can result in machine vibration (known as 'knocking') and damage to the calender apparatus. Further, it can result in damage to the web. Tearing of the web, particularly at the trailing edges of segments, can occur during extreme calendering. And, even if tearing damage to the web is not immediately apparent, calendering damage may result in a weakening in the integrity of the foil (eg. embrittlement as a result of cold working) and lead to subsequent failure in an assembled battery.

At the edges of the segment coatings, the thickness of the coating can be slightly greater than that of the bulk coated segment. These 'bumps' can further aggravate the aforementioned problems.

Thus, the use of conventional segment coating methods can unduly limit the amount of calendering that can otherwise be achieved on continuously coated webs. It is therefore desirable to develop means for minimizing the machine and web damage that are associated with segment coating in order to obtain greater levels of compaction.

SUMMARY OF THE INVENTION

The present invention includes improved designs and manufacturing methods for calendered, double side segment coated webs. The improvements are particularly useful for heavily calendered webs, examples of which are the electrodes typically used in current commercial non-aqueous rechargeable lithium ion batteries.

A conventional method of making a calendered, segment coated, continuous web includes the following steps. Segment coatings are repeatedly applied onto both sides of the web such that each segment coating has a leading edge and a trailing edge transverse to the web direction and such that the segment coatings on a first side of the web are longitudinally aligned with the segment coatings on the second side of the web. The leading edges and trailing edges of the first side segment coatings are thus proximate to the leading edges and the trailing edges of the second side segment coatings respectively. Then, the segment coated web is calendered between calender rolls. By way of definition, the coated segments are considered to enter the calender rolls at their leading edges. Thus, the web orientation during the calendering defines which edges are the leading and the trailing edges. The improved method of the invention comprises staggering at least one of the leading edges and the trailing edges of the first side segment coatings from the corresponding leading edges and trailing edges of the second side segment coatings in an amount sufficient to stepwise engage or disengage the calender rolls from the segment coatings on each side of the web during calendering. While perhaps not aesthetically pleasing, the staggered edge alignment can result in a reduction in web damage, including the incidence of web breakage on the line and also in the subsequent web application itself (eg. during operation of lithium ion batteries). Further, it can result in a reduction in vibration and wear on the calendering apparatus.

As much of the associated web and calendering apparatus damage can occur when the calender rolls are suddenly unloaded (ie. when the calender rolls disengage from the compressed segment coatings at the trailing edges), it can be particularly advantageous to stagger the trailing edges (ie. stagger the first side segment coatings from the corresponding trailing edges of the second side segment coatings).

Damage can also occur when the calender rolls are suddenly loaded (ie. when the calender rolls engage the uncompressed segment coatings at the leading edges), although it is often not quite as severe. Thus, it can be advantageous to stagger the leading edges as well. The benefits of the invention are even greater if 'bumps' are present in the segment coatings at the leading or the trailing edges.

A conventional method of applying the segment coatings comprises the steps of initially applying the first side segment coatings on the first side of the web with a horizontal segment coater apparatus, inverting the web, and finally applying the second side segment coatings on the second side of the web with the horizontal segment coater apparatus.

Generally, the thickness of the applied segment coatings is most accurate when the underside of the web is in direct contact with a support or backing of some kind (eg. a backing roller). However, webs that already have segment coatings applied on the underside cannot easily be supported in the immediate vicinity of short uncoated sections. Thus, it is generally advantageous to first apply segment coatings that will be larger or that will overlap the second segment coatings to be applied later. In that way, the underside of the web can be directly supported in the immediate vicinity of the second segment coating edges because there is still first side coating underneath. Thus, it can be preferred to have the first side segment coatings overlap the second side segment coatings at both the second side leading and trailing edges thereby leaving the second side of the web uncoated in the regions immediately opposite the leading and trailing edges of the first side coatings.

The invention is particularly suited for thin metal foil webs such as copper or aluminum foil. The thickness of these foils can be less than 25 micrometers thick.

The segment coatings themselves can comprise electroactive powders such as those used as lithium ion battery electrode materials. The invention can be used advantageously for powders with a particle size of order of 10 microns and/or for segment coatings that are approximately 100 micrometers thick. The greatest benefits can be achieved when the coated webs are heavily calendered to form dense, low porosity coatings (eg. coatings having a porosity less than about 35%).

In the instant invention, the appropriate edges of the first and second side segment coatings must be staggered an amount that is effective to stepwise engage or disengage the calender rolls. In other words, the amount staggered must essentially be sufficient to smooth out the transitions experienced at the segment coating edges such that the calender rolls first engage (or disengage) a segment coating on one side before engaging (or disengaging) the segment coating on the other side and such that web damage and calendering apparatus damage are prevented. Further, the amount staggered must exceed the normal variation or alignment error associated with intentionally aligned prior art webs (typically of order of 1 mm). We have found that in certain lithium ion battery electrode embodiments, a 2 mm staggering is effective to prevent such damage.

BRIEF DESCRIPTION OF THE DRAWINGS

The following Figures have been provided to illustrate certain aspects of the invention, but these should not be construed as limiting in any way.

DETAILED DESCRIPTION OF SPECIFIC EMBODIMENTS OF THE INVENTION

The web damage and calendering apparatus vibration and wear associated with the calendering of double side segment coated webs can be significantly reduced by use of the present invention. The advantages of the invention become most significant for webs that are to be heavily calendered.

Double side segment coated webs often have the segments aligned such that the segment edges on opposite sides match as closely as possible. The electrodes used in commercial non-aqueous rechargeable lithium ion batteries are such an example. In these electrodes, an uncoated portion is introduced between the segments to allow for the attachment of current carrying tabs. These electrodes are calendered substantially during processing. It has been found that severe distortion of the web (concaving) can occur if a coating appears on only one side of the web and is so calendered. Thus, if the coating is to be substantially calendered, it is preferable to have coatings on both sides and to align them opposite each other. Further, it is generally preferable to minimize the size of these uncoated portions in order to maximize the amount of electroactive coating contained in a battery. Thus, close alignment of the segment edges seems preferred.

However, when calendering close to the limits of the web and/or the apparatus, we have found that problems first occur at the transitions between coated and uncoated areas. As the extent of calendering increases, severe vibration of the calendering rolls can start to occur when the rolls are unloaded as they finish calendering a segment. Web breakage can also start to occur. These problems can be aggravated by irregularities in the coating thickness at the edges of the coated segments. Typically, a small bump or region of greater thickness associated with the application process appears at the edges.

By staggering the edges of the opposing side segment coatings slightly, the problems associated with troublesome transitions at the edges can be markedly reduced. While problems might usually first appear at the trailing edges of segments, problems might instead be encountered at the leading edges or indeed at both sets of edges. The staggering of either or both sets of edges might thus be useful in order to reduce calendering damage.

The invention is particularly suitable for use in the production of typical lithium ion battery electrodes. The following description is thus directed to lithium ion battery electrode design and manufacture and represents a preferred embodiment of the invention. However, the invention should not be construed as being limited thereto.

Figure 1A:
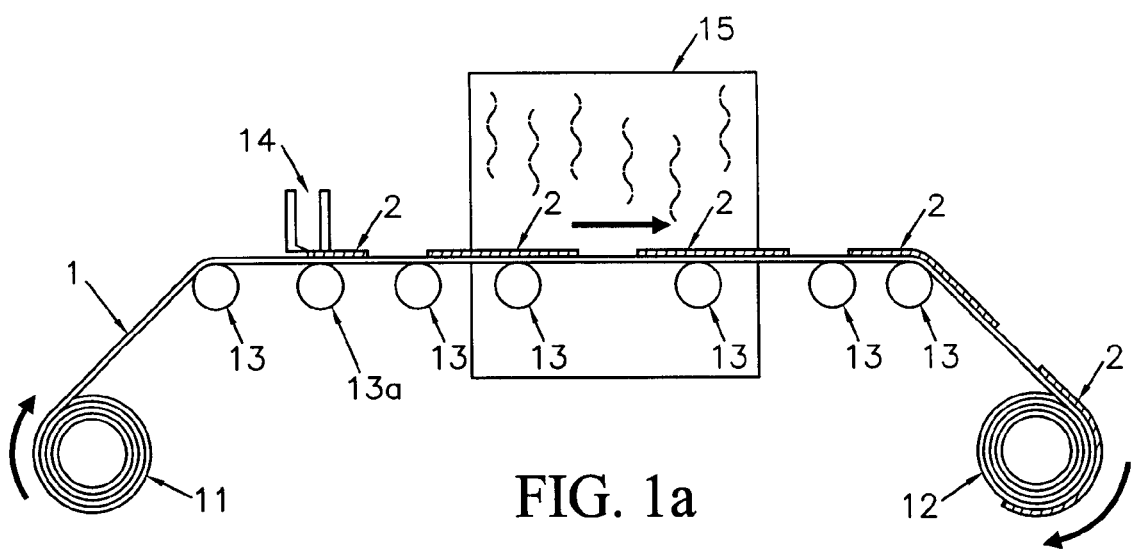
FIG. 1a schematically depicts a side view of a web having segment coatings applied on a first side in a conventional horizontal segment coater apparatus.

Double side segment coated electrodes can be prepared on conventional horizontal type segment coater apparatus as shown in FIGS. 1a and b. FIG. 1a shows the application of segment coatings 2 on a first side of a metal foil web 1. The web 1 runs continuously through the apparatus, originating at a supply spool 11 and ending at a take-up spool 12. The coatings 2 comprise suitable electroactive powders, a suitable binder (typically a fluoropolymer) and often a conductive dilutant (such as a carbon black). Beforehand, the binder is dissolved in a suitable liquid carrier and a slurry is prepared using this solution plus the other powdered solid components. This slurry is fed to a segment coater 14 which uniformly applies the slurry in segment fashion to the moving web 1. The edges of the segments are perpendicular (transverse) to the web direction. The carrier solvent is evaporated away in oven 15. Support rollers 13 are used throughout to support the web and especially underneath the segment coater 14 where one such roller serves as a backing roller 13a for accurate control of the applied slurry.

Figure 1B:
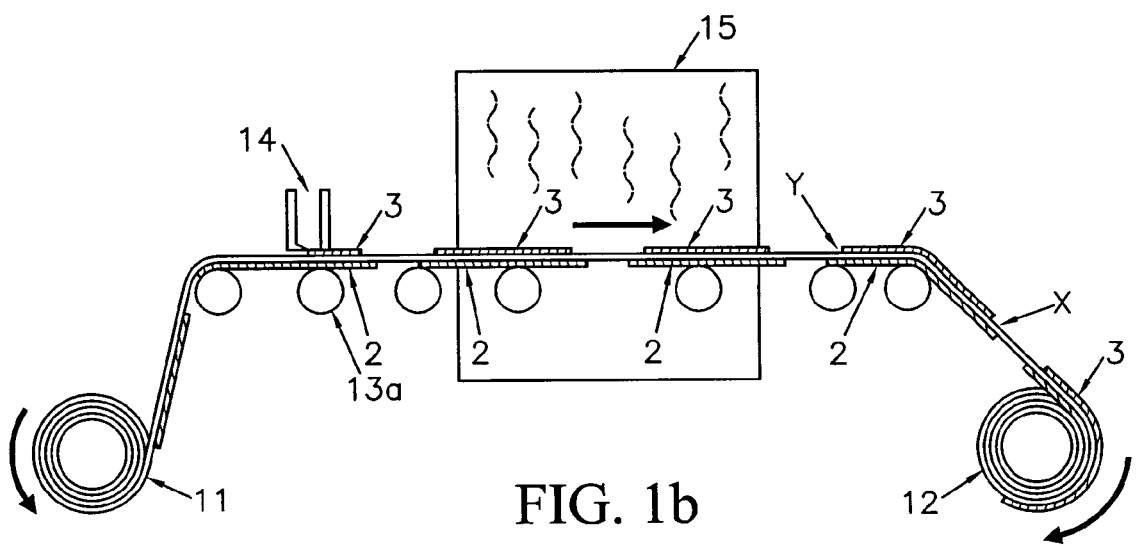
FIG. 1b schematically depicts a side view of the web of FIG. 1a having segment coatings applied on the second side in the same horizontal segment coater apparatus. The second side segment coatings are staggered in accordance with a preferred embodiment of the invention.

In order to apply the second side segment coatings, the first side coated web is then run through the same horizontal type segment coater apparatus again as shown in FIG. 1b. (Note that the web obtained at the take-up spool 12 in FIG. 1a becomes the supply spool 11 in FIG. 1b by mounting it in reverse.) The process is then repeated with second side segment coatings 3 being applied in appropriate proximate alignment with the first side segment coatings 2. A preferred staggered alignment of the invention is shown here wherein the first side coating slightly overlaps the second side coating in the areas denoted x and y.

Figure 2:
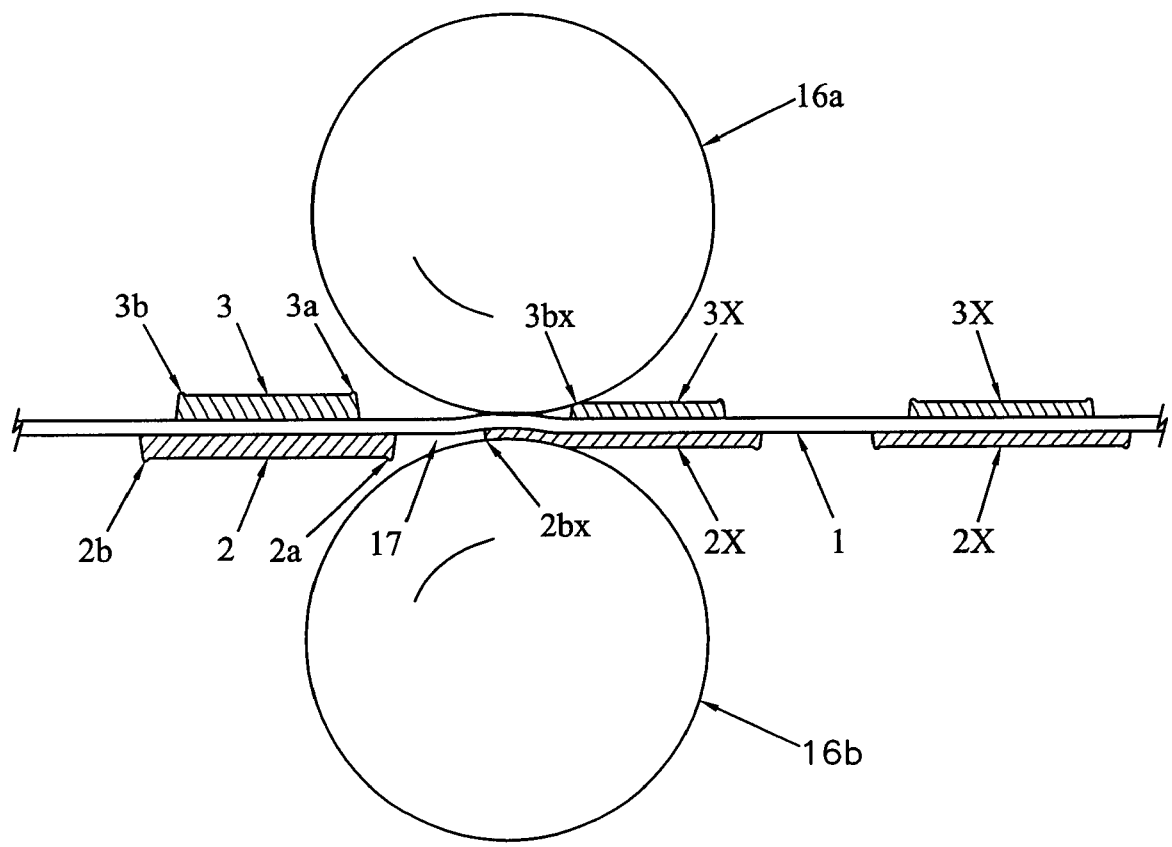
FIG. 2 schematically depicts a side view of the double side segment coated web of FIG. 1b as it is being calendered in accordance with the invention.

The double side segment coated web is then calendered as shown schematically in FIG. 2 using a calender roll apparatus. The apparatus can operate in either a fixed gap mode (where the distance between the rollers is fixed) or a fixed force mode (where the force applied to the web by the rollers is fixed) or even a combination thereof. Here, a set of calender rollers 16 is shown with the nip 17 set at a fixed gap commensurate with the degree of calendering desired. Uncompressed first side segments 2 and second side segments 3 on web 1 are fed into the nip 17 and exit as calendered segments 2X and 3X respectively. A preferred staggered alignment of the invention is shown here wherein the first side segment coatings slightly overlap the second side coatings at both edges. Leading edge 2a thus overlaps leading edge 3a and trailing edge 2b overlaps trailing edge 3b. Under very heavy loads, some minute flexing of the calender rollers occurs. So, unlike the case with continuously coated webs, the calender rolls undergo repetitive flexing loadings when used to heavily calender a segment coated web.

The area in the vicinity of the nip 17 shows an exaggerated view of upper roller 16a as it disengages a second side segment coating trailing edge 3bX while the corresponding first side segment coating trailing edge 2bX still remains in the nip 17. In actuality, the rollers 16 are much greater than the web or coating thicknesses shown here. Thus, the upper roller 16a would not be expected to completely disengage the second side segment 3 as shown where edge 3bX does not contact the upper roller 16a at all. Nonetheless, what amounts to a disengaging step takes place functionally.

Figure 3A:
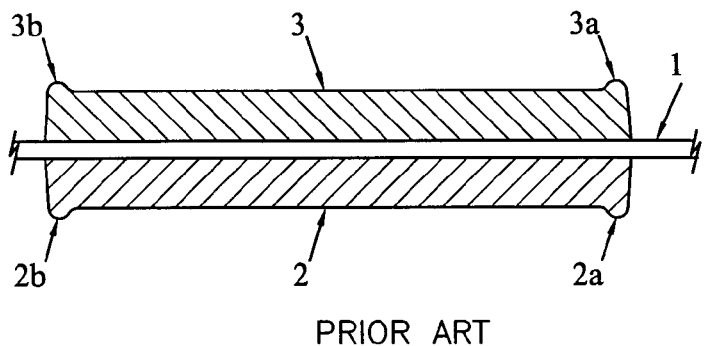
FIG. 3a depicts a side view of the conventional alignments of the segment coatings of calendered, double side segment coated, lithium ion battery electrodes.
Figure 3B:
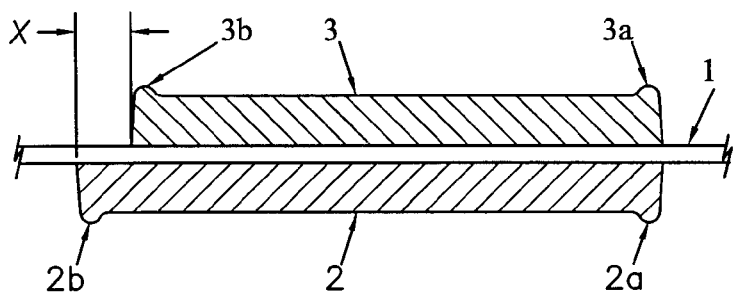
FIG. 3b depicts a side view of an embodiment of the invention comprising a calendered, double side segment coated, lithium ion battery electrode wherein only the trailing edges of the segments are staggered.

FIG. 3a shows a side view of a conventional double side segment coated web while FIGS. 3b to 3e show various side views of embodiments of the invention. In FIG. 3a, the leading edges 2a and 3a of the first and second side coatings respectively are purposely aligned. In a like manner, the trailing edges 2b and 3b of the first and second side coatings respectively are also purposely aligned. On the other hand, FIG. 3b shows an embodiment of the invention wherein the trailing edges are staggered an amount x. This embodiment may be preferred if web damage only occurs at the trailing edge. (Note that small bumps are shown at the segment coating edges in all these Figures. Such small bumps can be common when using the preceding coating method.)

Figure 3C:
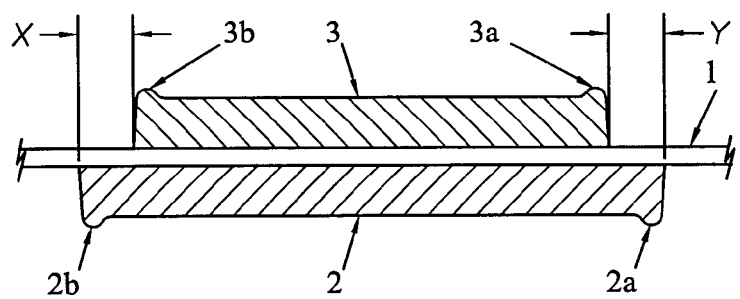
FIG. 3c depicts a side view of a preferred embodiment of the invention comprising a calendered, double side segment coated, lithium ion battery electrode wherein both the leading and trailing edges of the segments are staggered. Here, the first side segment coatings overlap the second side segment coatings at both edges.
Figure 3D:
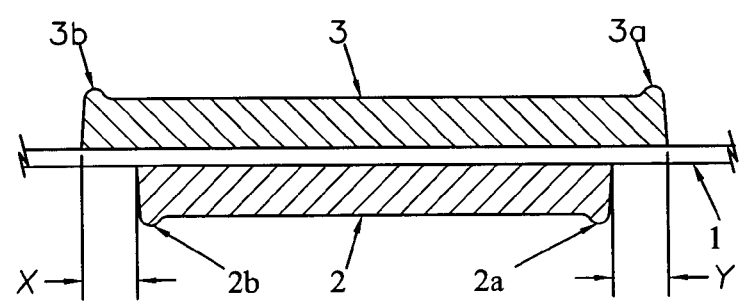
FIG. 3d depicts what to the eye is essentially an inverted view of FIG. 3c wherein the second side segment coatings overlap the first side segment coatings at both edges. While this configuration during coating is effective for the purposes of the invention, it may not be preferred for the most accurate thickness control of the coatings.
Figure 3E:
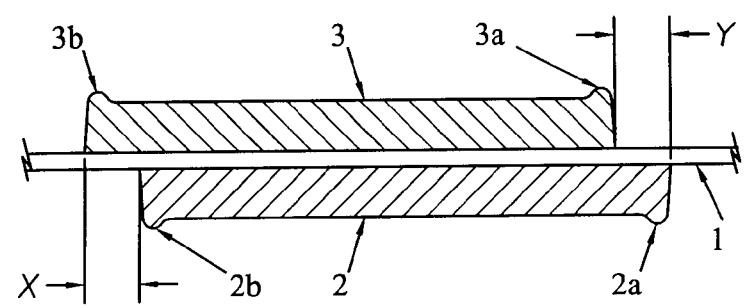
FIG. 3e depicts a side view of an alternate embodiment of the invention comprising a calendered, double side segment coated, lithium ion battery electrode wherein both the leading and trailing edges of the segments are staggered. Here however, the segment coating of the first side overlaps that of the second side at one edge and the segment coating of the second side overlaps the coating of the first side at the other edge.

FIGS. 3c, 3d, and 3e show embodiments wherein both trailing and leading edges are staggered an amount x and y respectively. As mentioned previously, the thickness of the applied segment coatings is most accurate when the underside of the web is in direct contact with a support or backing of some kind (eg. backing roller 13a in FIG. 1b). For this reason, it is generally advantageous to have the first side segment coatings overlap the second segment coatings at both the leading and trailing edges. In that way, the underside of the web can be directly supported by the edges of the first side coatings over the whole length of the applied second side coatings. Thus, in this regard, the embodiment of FIG. 3c is preferred. (Note that without knowledge of which side of the web was coated first, embodiments 3c and 3d can be almost indistinguishable. It is only the accuracy of the coatings, particularly at the edges, which would be expected to differ.)

The optimum amount that the coated segment edges should be staggered in order to reduce web damage and machine vibration depends on the characteristics of the specific coated web embodiments. The optimum amount can be determined empirically and involves no inventive input. For typical heavily calendered lithium ion battery electrodes comprising about 100 micrometer thick electroactive powder (of order of 10 micron particle size) coatings on thin metal foil webs (of order of 25 micrometers thick), we have found that staggered amounts of more than 2 mm or so are effective.

After calendering, lithium ion battery electrodes prepared as above are ready for subsequent assembly in the usual way. Typically, because the foil is somewhat enlarged by the calendering, a small section of the longitudinal edges of the web are removed in a slitter to provide clean uniform edges. Thereafter, the electrodes can be spirally wound to form electroactive jelly-roll assemblies for batteries.

Along with the immediately apparent advantages of a reduction in web breakage and apparatus vibration/wear during calendering, use of the instant invention is expected to reduce web damage generally. Such web damage might not cause an immediate failure during battery assembly or even during initial operation of the battery. However, this damage might manifest itself in a later failure, such as web breakage in the battery itself after moderate usage by the consumer.

The following non-limiting Examples are representative of aspects of the invention. In these Examples, metal foils were segment coated on commercial scale equipment as shown schematically in FIGS. 1a and b and were calendered on commercial scale equipment as shown schematically in FIG. 2.

COMPARATIVE EXAMPLE 1

A commercial scale batch of anode electrode for lithium ion batteries was prepared as generally described above. The web used was a 10 micron thick Cu metal foil. Segment coatings were repeatedly applied on both sides of the web using 70 L worth of slurry. The slurry comprised a mixture of a graphitic powder of average particle size 30 microns, a carbon black conductive dilutant, and a fluoropolymer binder dissolved in carrier solvent. The segment coatings as applied were of order of 50 cm long and of order of 100 microns thick each, for a total electrode thickness of order of 200 microns thick. The leading and trailing edges of each side's segments were aligned in a conventional manner (ie. aligned as well as possible). Here, edge alignment from side to side was maintained to within 1 mm.

Minor 'bumps' were observed at the edges of the segment coatings. The biggest of these appeared where the coating was terminated during the application of the first side coatings. A similar but even smaller bump appeared where the coating was terminated during the application of the second side coatings. It is believed that the second side coating edges are somewhat buffered by the presence of the underlying first side coating that contacts the backing roller when the second side is coated. The width (ie. parallel to the web direction) of these bumps was of order of 2 mm and the thickness added by the bumps was of order of 10 micron.

The segment coatings were heavily calendered after the second side coatings were applied to a total electrode thickness of order of 130 microns thick (equivalent to a porosity of about 32%). The web speed was about 5 m/min. Severe machine vibration and 'knocking' were experienced throughout the calendering. On four occasions, the copper foil web broke as trailing edges of the segment coatings entered the nip of the calender rolls, thereby temporarily stopping the run and necessitating a resetting/restarting of the run.

INVENTIVE EXAMPLE 1

A commercial scale batch of anode electrode was prepared as in Comparative Example 1 except that the segment coatings were applied in accordance with the invention and as shown in the preferred embodiments of FIG. 2 and FIG. 3c. Here, edge alignment from side to side was maintained to be about 2 mm offset at both leading and trailing edges.

The segment coatings were heavily calendered after the second side coatings were applied to the same total electrode thickness as in Comparative Example 1. Machine vibration and 'knocking' were reduced substantially throughout the calendering. At no time did the copper foil web break. Since the run was proceeding very successfully, the web speed was increased during the run. The web speed was thus varied from about 6 to 8.5 m/min.

COMPARATIVE EXAMPLE 2

A commercial scale batch of cathode electrode for lithium ion batteries was prepared as generally described above. The web used was a 20 micron thick Al metal foil. Segment coatings were repeatedly applied on both sides of the web using 70 L worth of slurry. The slurry comprised a mixture of a spinel structured lithium manganese oxide powder of average particle size 30 microns, a carbon black conductive dilutant, and a fluoropolymer binder dissolved in carrier solvent. The segment coatings as applied were of order of 50 cm long and of order of 150 microns thick each, for a total electrode thickness of order of 300 microns thick. The leading and trailing edges of each side's segments were aligned in a conventional manner (ie. aligned as well as possible). Here, edge alignment from side to side was maintained to within 1 mm.

The segment coatings were heavily calendered after the second side coatings were applied to a total electrode thickness of order of 190 microns thick (equivalent to a porosity of about 25%). The web speed was varied from about 3 to 6.5 m/min. Severe machine vibration and 'knocking' were experienced throughout the calendering. The aluminum foil web however did not break during the run.

Several jelly-roll assemblies for lithium ion batteries were spirally wound using this heavily calendered cathode web. Several breaks in the aluminum web were observed in these jelly-roll windings.

INVENTIVE EXAMPLE 2

A commercial scale batch of cathode electrode was prepared as in Comparative Example 2 except that the segment coatings were applied in accordance with the invention and as shown in the preferred embodiments of FIG. 2 and FIG. 3c. Again here, edge alignment from side to side was maintained to be about 2 mm offset at both leading and trailing edges.

The segment coatings were heavily calendered after the second side coatings were applied to the same total electrode thickness as in Comparative Example 2. Machine vibration and 'knocking' were reduced substantially throughout the calendering. Again, at no time did the aluminum foil web break. As in Inventive Example 1, it was possible to increase the web speed during the run successfully (ie. with the vibration and knocking still being substantially reduced). Again here, the web speed was varied from about 6 to 8.5 m/min.

Several jelly-roll assemblies for lithium ion batteries were spirally wound using this heavily calendered cathode web. No breaks in the aluminum web were observed in these jelly-roll windings.

In the above examples, use of the invention consistently results in a reduction in the 'knocking' and vibration of the calendering apparatus. Further, use of the invention clearly reduces the frequency of web breakage in the case of the anode run. Those in the art will appreciate that this is indicative of a general reduction in web damage.

Further, those skilled in the art will be aware that the preceding disclosure discusses only some embodiments of the invention and that many other embodiments may be possible within the scope thereof. For instance, other means might be employed for applying the segment coatings in such a way that both sides are coated simultaneously. Also, the invention is not restricted in principle merely to lithium ion battery electrodes. Accordingly, the scope of the invention should be construed by the following claims.

What is claimed is:

1. A calendered, segment coated, continuous web having segment coatings repeatedly applied on both sides of the web, each segment coating having a leading edge and a trailing edge transverse to the web direction, the segment coatings on a first side of the web being longitudinally aligned with the segment coatings on the second side of the web whereby the leading edges and trailing edges of the first side segment coatings are proximate to the leading edges and the trailing edges of the second side segment coatings respectively, wherein at least one of the leading edges and the trailing edges of the first side segment coatings is staggered at least 1mm from the corresponding leading edges and trailing edges of the second side segment coatings.

2. A calendered, segment coated, continuous web as claimed in claim 1 wherein both the leading edges and the trailing edges of the first side segment coatings are staggered at least 1 mm from the corresponding leading edges and trailing edges of the second side segment coatings.

3. A calendered, segment coated, continuous web as claimed in claim 2 wherein the first side segment coatings overlap the second side segment coatings at both the second side leading and trailing edges thereby leaving the second side of the web uncoated in the regions immediately opposite the leading and trailing edges of the first side coatings.

4. A calendered, segment coated, continuous web as claimed in claim 1 wherein at least one of the leading edges and the trailing edges of the first side segment coatings is staggered at least 2 mm from the corresponding leading edges and trailing edges of the second side segment coatings.

5. A calendered, segment coated, continuous web as claimed in claim 1 wherein the web is a thin metal foil.

6. A calendered, segment coated, continuous web as claimed in claim 5 wherein the web is copper or aluminum foil.

7. A calendered, segment coated, continuous web as claimed in claim 6 wherein the foil is less than 25 micrometers thick.

8. A calendered, segment coated, continuous web as claimed in claim 1 wherein the segment coatings comprise electroactive powders.

9. A calendered, segment coated, continuous web as claimed in claim 8 wherein the porosity of the segment coatings is less than about 35%.

10. A calendered, segment coated, continuous web as claimed in claim 8 wherein the particle size of the powders is of order of 10 microns.

11. A calendered, segment coated, continuous web as claimed in claim 10 wherein the segment coatings are approximately 100 micrometers thick.

12. A calendered, segment coated, continuous web as claimed in claim 8 wherein the powders are lithium ion battery electrode materials.

* * * * *